(12) United States Patent
Murakami et al.

(10) Patent No.: US 6,780,572 B1
(45) Date of Patent: Aug. 24, 2004

(54) OPTICAL LITHOGRAPHY

(75) Inventors: Tamotsu Murakami, Tokyo (JP);
Akiya Kamimura, Ibaraki (JP)

(73) Assignee: Toudai TLO, Ltd., Tokyo (JP)

( * ) Notice: Subject to any disclaimer, the term of this patent is extended or adjusted under 35 U.S.C. 154(b) by 86 days.

(21) Appl. No.: 10/049,105

(22) PCT Filed: Aug. 2, 2000

(86) PCT No.: PCT/JP00/05174
§ 371 (c)(1),
(2), (4) Date: May 31, 2002

(87) PCT Pub. No.: WO01/10632
PCT Pub. Date: Feb. 15, 2001

(30) Foreign Application Priority Data

Aug. 5, 1999 (JP) .......................................... 11-223096

(51) Int. Cl.[7] ............................................... G03F 7/26
(52) U.S. Cl. ........................ 430/322; 430/396; 264/401
(58) Field of Search ................................ 430/322, 396;
264/308, 401; 156/379.6; 700/120, 182

(56) References Cited

FOREIGN PATENT DOCUMENTS

| EP | 0499485 A2 * | 6/1989 |
|---|---|---|
| EP | 0322257 A2 * | 8/1992 |

* cited by examiner

*Primary Examiner*—Kathleen Duda

(57) ABSTRACT

In an optical lithography using a mask pattern, or producing a large quantity of three-dimensional articles rapidly with high precision, a predetermined mask pattern is drawn directly on the surface of a resin composition for optical lithography, and the mask pattern is irradiated with light, thereby irradiating the surface of the resin composition containing a photocurable component through the mask pattern The step of forming a cured resin layer corresponding to the drawing is repeated to form a three-dimensional article composed of multiple cured resin layers. Thus, unlike the beam scanning, the curing is uniform in cross section.

7 Claims, 3 Drawing Sheets

OPTICAL LITHOGRAPHY

BACKGROUND OF THE INVENTION

1. Field of the Invention

The present invention relates to an optical lithography using a photocurable component for producing a three-dimensional article.

2. Background Art

Optical lithography, as indicated by the name, in a method comprising successively scanning a liquid photocurable component with a laser beam without using a mould at all, and curing/laminating resin layers to eventually produce a three-dimensional article (Yoji Maritani, et al., "Optical Lithography-Three-Dimension Plotter using Laser", Nikkan Kogyo Newspaper). According to this method, for example, formed articles such as a skull model that could be made by utilizing results of CT scanning, which are unable to be made by the conventional extrusion or other plastic forming, can be made with perfect ease. Furthermore, with the background of the rapid prototyping receiving much attention at home and abroad in recent years, the optical lithography has become one of the typical forming methods.

Herein, more specifically describing the optical lithography, according to this optical lithography, the formation of a three-dimensional article is carried out by pattern irradiation of light on the surface of a resin composition for optical lithography contain a photocurable component in order to form a cured resin layer corresponding to the pattern, and lamination of such layers to form the three-dimensional shape with a plurality of such cured resin layers. Therefore, a three-dimensional article is formed by analyzing a three-dimensional shape of the article with a computers preparing and accumulating a plurality of data of sliced parts of the shape, radiating ultraviolet laser on a surface of each layer of resin composition for optical lithography according to the data of each layer in the order, and thereby forming photocured resin composition layers one after another.

For example, in the Japanese Patent Laid-open Publication No. Sho56-144478, a method for forming a three-dimensional article has been disclosed, wherein the method comprises placing a liquid photocurable component in a vessel, selectively irradiating the surface of the photocurable component by scanning an exposure means provided on the upper part of the vessel to form a cured resin layer, supplying the photocurable component for one layer over this cured rein layer to form a liquid resin layer, selectively irradiating the surface thereof with light to laminate a fresh cured resin layer as a unit over the previously formed cured resin layer was to continue with each other, and repeating the supply of the photocurable component and irradiation with light predetermined times.

In the conventional optical lithography apparatuses, usually using the ultraviolet laser, a selective drawing of pattern is arranged to be performed for every layer in a rater scanning system. However, in this method, there are problems such as non-uniform resin shrinkage and non-uniform curing depth in cured layers caused by scanning intervals and power instability of laser. Furthermore, there is also another problem that, due to the curing/shrinkage characteristics of rein, shrinkage occurs somewhat after the laser drawing so that shrinkage proceeds with time according to the laser drawing traces, resulting in the generation of internal stress to become liable to form warps in cured layers.

Furthermore, there is yet another problem that, due to not only the low energy efficiency of laser but also especially a short life time of a laser generator to emit the ultraviolet ray required to cure the photocurable component, the continuous and large-scale forming of articles by optical lithography is disadvantageous in terms of cost.

Thus, there has been proposed a method for selectively irradiating the surface of photocurable component through a predetermined mask pattern with the parallel ultraviolet ray emitted from a mercury lamp, etc. For example, in the Japanese Patent Laid-open Publication No. Hei2-78531, as a method for selectively irradiating the surface of photocurable component with light, a method for exposing the surface to light through a mask pattern, which selectively transmits light, has been disclosed.

However, in such a method using mask, there in a problem that said method is uneconomical after all because of the requirement of a great number of mask patterns. In addition, there is another problem that the light diffraction occurs at the time of light transmission through the mask to blur the designed pattern so that the pattern with fine precision cannot be formed. Furthermore, a large number of mask patterns are generally prepared by drawing each of them with toner every one layer on a transparent glass plate, or by forming a pattern every one layer with the liquid crystal shutter. In these cases, there are problems that ultraviolet ray cannot be completely shut out at critical portions, and also that the liquid crystal and glass plate tend to be worn out with ultraviolet ray so that they cannot stand a long-term use and are not suitable for forming articles by optical lithography on a large scale.

SUMMARY OF THE INVENTION

In view of the above-described problem, the present invention has been made aiming at providing an optical lithography using a mask pattern for producing a large quantity of three-dimensional articles rapidly with high precision.

In order to solve the above-described problems, an optical lithography according to this invention is characterized in that a predetermined mask pattern is drawn directly on the surface of a resin composition for optical lithography to be irradiated from above with light, thereby preventing the decline in precision due to the diffraction of irradiation light, and in that a resin composition for optical lithography is further laminated to be photocured without removing the mask pattern, thereby overcoming difficulties in the adjustment of photocuring in the depth direction that have been the drawback in optical lithography.

Optical Lithography According to this Invention

More specifically, the present invention provides the following optical lithography.

(A1) An optical lithography for forming a three-dimensional article composed of multiple cured resin layers by irradiating light over a mask pattern previously drawn on a surface of a resin composition for optical lithography containing a photocurable component, and repeating such irradiating step to form a cured resin layer corresponding to the drawn pattern, wherein the lithography is characterized by the light irradiation over the predetermined mask pattern that is drawn directly on the surface of the resin composition for optical lithography. In this invention, the rapid gelation described below may be preferable, but is not essential (methods according to the procedures described in Japanese Patent Laid-open Publication No. Hei9-70897, Japanese Patent Laid-open Publication No. Sho56-144478, etc. may be applied: that is, a method of irradiating a resin composition for optical lithography over a mask pattern drawn directly on the composition after solidifying the resin composition by cooling it below a room temperature and a method of irradiating light over a mask pattern directly drawn on a surface of the resin composition while it still has fluidity.).

(A2) An optical lithography for forming a three-dimensional article composed of multiple cured resin layers by irradiating light over a mask pattern previously drawn on a surface of a resin composition for optical lithography containing a photocurable component, and repeating irradiating step to form a cured resin layer corresponding to the drawn pattern, wherein the optical lithography is characterized in that a resin composition capable of making a reversible and rapid sol-gel phase transition with some physical stimulus is employed as the resin composition for optical lithography, and wherein the optical lithography comprises gelating rapidly the resin composition for optical lithography by applying "some physical stimulus", directly drawing a mask pattern on the surface of the gelated resin composition for optical lithography, and irradiating light over the mask pattern.

(A3) An optical lithography comprising supplying a one-layer amount of resin composition for optical lithography containing a photocurable component, which is capable of making a reversible and rapid sol-gel phase transition with some physical stimulus, to form the $n^{th}$ resin layer, gelating the $n^{th}$ resin layer with some physical stimulus, drawing a predetermined mask pattern directly on the gelated $n^{th}$ resin layer, forming the $n^{th}$ cured resin layer by irradiating the $n^{th}$ resin layer with light over the mask pattern to photocure the $n^{th}$ resin layer according to the mask pattern, and supplying the resin composition for optical lithography for one layer over the $n^{th}$ cured resin layer to form the $(n+1)^{th}$ resin layer.

(A4) An optical lithography as described in any one of the above (A1) through (A3), wherein the optical lithography is characterized in that the "some physical stimulus" is a temperature change.

(A5) An optical lithography as described in any one of the above (A1) through (A4), wherein the resin composition for optical lithography contains a photocurable component comprising urethane acrylate series, ester acrylate series, epoxy acrylate series, or epoxy series.

(A6) An optical lithography as described in any one of the above (A1) through (A5), wherein the resin composition for optical lithography comprises a photocurable component, syndiotactic poly(methacrylic acid ester) and isotactic poly (methacrylic acid ester).

(A7) An optical lithography as described in the above (A6), wherein the resin composition for optical lithography contains photocurable components, syndiotactic poly (metylmethacrylate) and isotactic poly(metylmethacrylate).

Photocurable Component used in Optical Lithography

The photocurable component used in the optical lithography may include material also referred to as photosensitive resin, which is widely used, for example, as the resist at etching in the process of manufacturing semiconductors.

In an optical lithography according to this invention, as the photocurable component, either oligomer having one functional group or more per molecule capable of reacting to light irradiation to form a cross-linkage or monomer having one similar functional group or more per molecule, or both of them are used. Examples of the oligomers comprise radical polymerization type photocurable resins such as unsaturated polyester resins, acrylic resins, en-thiol resins, etc. or cation polymerization type photocurable resins such as epoxy resins (needles to say, besides these, for example, a mixture of novolac resin with a photosensitizer such as diazonaphtoquinone sulfonic acid ester may be used.) Among them, acrylic resin such as ester acrylate, urethane acrylate and epoxy acrylate in particular an preferable as the oligomers which are contained in resin compositions for optical lithography according to this invention. Examples of the above-described monomers are radical polymerization type monomers such as acrylic acid esters, methacrylic acid esters, etc. and cation polymerization type monomers such as epoxy-containing compounds, etc. Among them, radical polymerization type monomers are preferable in a view of the curing speed and post-curing physical properties thereof.

In addition, to promote the speedy occurrence of photoreaction, the resin composition for optical lithography may be prepared to contain a small amount of photosensitizers (such as nitro compounds, quinones and ketones, etc.). Furthermore, the resin composition for optical lithography according to this invention may comprise fillers (reinforcements), plasticizers, stabilizers, colorants, fire retardants, antioxidants or antistatic agents, etc.

Herein, resin compositions useable as the rein composition for optical lithography in an optical lithography according to this invention or resin composition preferable as the resin composition for optical lithography according to this invention are described as follows:

(B1) a resin composition for optical lithography comprising a photocurable component which solidifies by irradiation with light and a resin component of rapid phase transition capable of causing the phase transition sol to "gel distinguishable from the photocured portion" with some physical stimulus.

(B2) a resin composition for optical lithography comprising a photocurable component which solidifies by irradiation with light, and a resin component of reversible and rapid phase transition capable of causing a reversible as well as rapid sol-gel phase transition with some physical stimulus.

(B3) a resin composition for optical lithography as defined in the above (B2) characterized in that "some physical stimulus" may be a temperature change.

(B4) a resin composition for optical lithography as described in the above (B3) characterized in that the resin component of reversible rapid phase transition comprises a mixture of a syndiotactic poly(methyl methacrylate) and isotactic poly(methyl methacrylate).

(B5) a resin composition for optical lithography as described in the above (B4) characterized in that the photocurable component comprises a photocurable resin of the urethane acrylate series, ester acrylate series, epoxy acrylate series or epoxy series.

Definitions and Others

"Resin component of rapid phase transition" has been defined as "a resin component of rapid phase transition capable of causing a phase transition "rapidly from sol with some physical stimulus" to "gel distinguishable from the photocured portion", or as "a resin component of reversible rapid phase transition capable of causing a reversible and rapid sol-gel phase transition with some physical stimulus", which is a component expressing a property rapidly causing "the sol-gel phase transition" or "gel-sol phase transition" by the physical interaction between the resin component of rapid phase transition and at least a portion of the photocurable component without showing such a "glass transition" observed with usual resins when said resin component of rapid phase transition and photocurable component are mixed. More specifically speaking, ordinary resins, for example, gradually soften at and above the glass transition temperature (Tg) as the temperature is raised. However, in the case where "some physical stimulus" to a resin component of rapid phase transition is a temperature change, a resin composition comprising a resin component of rapid phase transition and photocurable component shows no state termed "glass transition" even though temperature is gradually elevated, (accordingly no glass transition temperature is observed.), and becomes solated with a rapid decrease in viscosity at a specific temperature (Tp) (FIG. 1).

Herein, a term "some physical stimulus" means such a temperature change and light irradiation, and, in the case of "temperature change", it may comprise a temperature change from high to low or from low to high.

"Gel distinguishable from the photocured portion" means, for example, a photocured portion is insoluble while a non-photocured gelated portion is soluble when immersed in some solvent.

In the present specification, "component" means an essential element in the entire resin composition for optical lithography for implementing the optical lithography, and the element (i.e. "component") may be a purified substance or a mixture.

"Light irradiation over a mask pattern" is performed according to ice patterns formed on sliced parts of the three-dimensional shape of an article to be produced, and, in this invention, carried out by irradiating light over the mask pattern formed directly on the resin composition for optical lithography corresponding to the slice patterns.

"Irradiation light" used for irradiation with light is a light having a specific wave length capable of photocuring the resin composition for optical lithography, and the ultraviolet ray, visible light, etc. may be used for photocurable components in general, while the ultraviolet ray is generally used. In this invention, the mask pattern is drawn directly on the resin with no distance between the mask and resin surface, so that no consideration is required for the diffusion of light. Therefore, the "irradiation light" used in this invention need not be the parallel light as far as the light has a predetermined light intensity to photocure the resin composition for optical lithography.

Material for forming the "mask patterns" may be anything to reflect or absorb an "irradiation light" as far as they are able to shade the "irradiation light" used for the light irradiation. In this case, taking the convenience of drawing patterns into consideration, a liquid material is preferable since the "mask pattern" is drawn directly on the resin, but a solid material such as powdered material may be employed as the occasion may demand.

BEST MODE FOR IMPLEMENTING THE INVENTION

According to techniques of this invention, an ordinary component for optical lithography becomes photocured with ultraviolet ray, so that an ultraviolet ray blocking layer is arranged to be drawn directly on the light exposure surface of the resin composition, and, after the light irradiation, the resin composition is further supplied to be laminated on the surface. For that purpose, the ultraviolet ray blocking layer should be in such a range (of several microns) of thickness that it may be fixed on the light exposure surface, but may not affect the precision in the height direction.

The present inventors have searched for a system which meets these requirements, and, after repeated trial and error, found that an ink-jet recording system, which is employed in the ink-jet printer as a generally popularized printer for personal computers nowadays, is preferable to be employed. Thus, for implementing an optical lithography according to this invention, it is desirable to employ an ink-jet according system using a component to block ultraviolet ray (ultraviolet ray blocking component) such as ultrafine titanium oxide dispersed in a solvent in place of ink.

Furthermore, as the ultraviolet blocking component, not only inorganic materials such as the above-described ultrafine titanium oxide but also ultraviolet absorbing organic compounds such as polyglycidylmethacylate etc. may be used. As other ultraviolet blocking components, ultraviolet ray blocking agents such as 2-hydroxybenzophenone series, triazole series, salicylic acid derivatives series, acrylonitrile series, etc., which are stabilized due to the intramolecular rearrangement caused by ultraviolet absorption, or compounds having chromophores and auxochromes in aromatic derivatives may be used.

Figure 1:
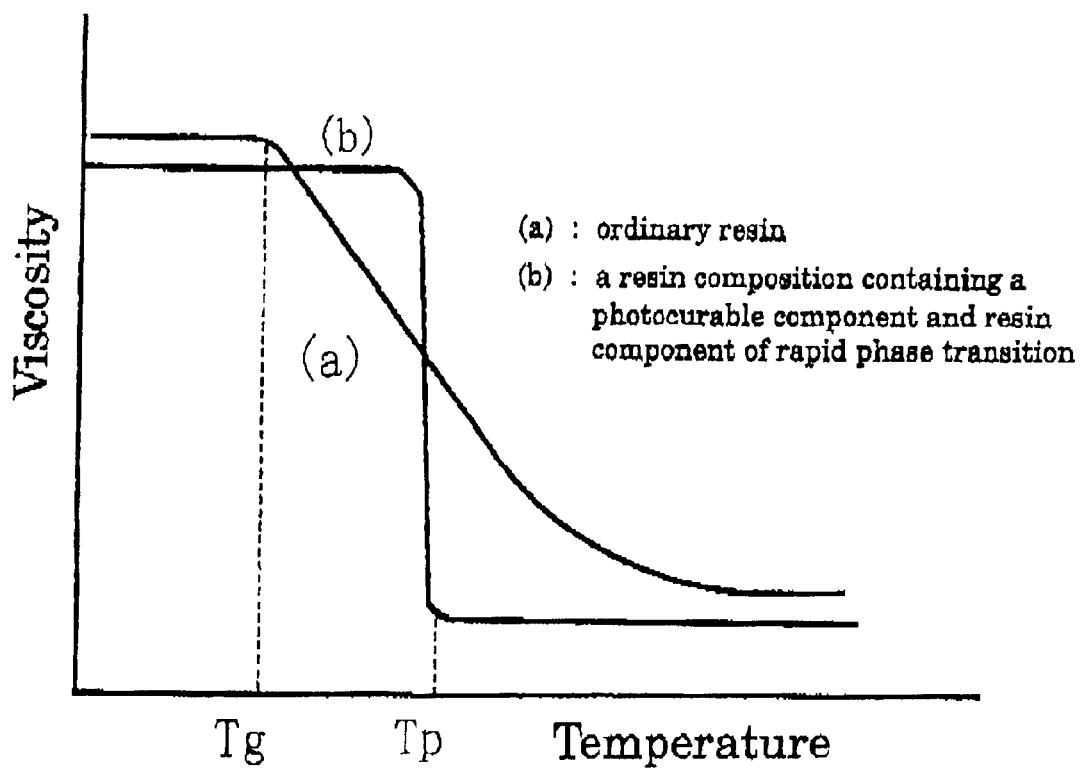
FIG. 1 is a graphic representation illustrating the behavior/function of a resin component of rapid phase transition.

Resin Compositions for Optical Lithography Used in the Optical Lithography According to this Invention In the optical lithography according to this invention, it is necessary to take into consideration the fixability of the ultraviolet ray blocking component to the resin composition for optical lithography. Furthermore, for a smooth procession of the process of further supplying the resin composition for optical lithography over the photocured resin composition for optical lithography, it is necessary to adjust the composition so that the resin composition has the viscosity suitable for its supply at the supplying temperature. Those skilled in the art can easily perform such adjustments by appropriately controlling the amount and type of monomers classified into the photocurable component. In addition, in the case where a resin composition for optical lithography is the one which causes a rapid phase transition by a temperature change, it is preferable that the phase transition temperature (Tp in FIG. 1) of the composition is somewhat higher than the ordinary temperature (e.g. temperature in the range of 50~100° C.).

A resin composition for optical lithography preferably contains a resin component of a reversible and rapid phase transition having a function capable of causing a reversible and rapid sol-gel phase transition in response to a temperature change. Components known in the field having the function to cause the sol-gel phase transition with lowering temperature are mixtures of syndiotactic poly(methacrylic acid esters) such as syndiotactic poly(methylmethacrylate), syndiotactic poly(isobutyl methacrylate), syndiotactic poly (benzyl methacrylate), syndiotactic poly(metallyl methacrylate), etc. and isotactic polymethacrylate esters such as isotactic poly(methylmethacrylate) (e.g. Japanese Patent Laid-open Publication No. Hei4-6562, Japanese Patent Laid-open Publication No. Hei4-225009, Japanese Patent Laid-open Publication No. Hei6-332176, Japanese Patent Laid-open Publication No. Hei7-281426, Japanese Patent Laid-open Publication No. Hei8-281669, J. Spevacek and B. Schneider, Aggregation of Stereoregular Poly(methyl methacrylates), Advances in Colloid and Interface Science, 27 (1987) 81–150, etc.). Since, in the case where a mixture comprising syndiotaoc and isotactic poly(methacrylic acid esters) is used as a resin component of reversible and rapid phase transition, preferred relative amounts of components constituting a resin composition for optical lithography, namely photocurable components, syndiotactic poly(methacrylic acid esters) and isotactic poly(methacrylic acid esters), are varied according to various conditions such as type of photocurable components, types and stereoregularity of syndiotactic poly(methacrylic acid esters), types and stereoregularity of idiotactic poly(methacrylic acid eaters), etc., it is desirable to determine the relative amounts appropriately based on experiments.

Furthermore, a resin component of reversible and rapid phase transition which causes a phase transition from sol to gel with the elevation of temperature has been also known in the field (cf. Japanese Patent Laid-open Publication No. Hei9-192469, Japanese Patent Laid-open Publication No. Hei9-227329, Japanese Patent Laid-open Publication No. Hei10-77201, Japanese Patent Laid-open Publication No. Hei10-101518, and Japanese Patent Laid-open Publication No. Hei11-169703).

Optical Lithography Process

According to optical lithography of this invention, the following processes are repeated: extruding a one-layer amount of the resin composition for optical lithography onto a predetermined elevator stand, drawing a mask pattern directly on the surface of the resin composition (preferably the composition solidified (gelated) after extrusion), photocuring the composition, and extruding a one layer amount of the resin composition for optical lithography onto the photocured layer leaving the mask pattern on the layer. After the resin composition for optical lithography is photocured for the entire shape of three-dimensional article to be produced, the un-cured portions are removed to ultimately yield a three-dimensional article desired to be formed.

Herein, in the case where a resin composition for optical lithography containing a resin component of rapid phase transition capable of causing a rapid phase transition from sol to "gel distinguishable from the photocured portion" with some physical stimulus is used as the resin composition for optical lithography, and where the phase transition of the resin composition is irreversible, the uncured gel portion can be removed using a predetermined solvent, etc. On the other hand, in the case where a resin composition for optical lithography containing a resin component of reversible and rapid phase transition capable of causing a reversible and rapid sol-gel phase transition with some physical stimulus is used as the resin composition for optical lithography, the uncured gel portion can be removed by applying the physical stimulus to transform the uncured gel portion to sol of fluidity (for example, in the case of causing a rapid gel-sol phase transition by raising temperature, the uncured gel portion is heated to be transformed to sol of fluidity and flows out for removal.). Herein, in the case where the gel portion is removed by transforming it to sol, the sol may be removed by swelling or dissolving it in a solvent, or, after its removal, a three-dimensional article thus obtained may be washed with a solvent. Furthermore, after the removal of uncured portions, the three-dimensional article may be further irradiated with light to make the curing more complete and improve the physical properties thereof such as rigidity.

Furthermore, for implementing the present invention in which a mask pattern is drawn directly on the resin composition and the resin is further laminated over the resin composition, besides the use of a resin composition for optical lithography containing a resin component of reversible and rapid phase transition as described above, a resin containing a volatile solvent may be used so that a process is repeated wherein a mask pattern is drawn on the surface which has been dried after the layer formation, and the resin is further laminated over the mask and dried.

EXAMPLES

In the following, the present invention will be described with reference to preferred embodiments. In the lithography according to this invention, it is important that the photocurable component and resin component of rapid phase transition contained in the resin composition for optical lithography have the desired functions, and in accordance with this invention, the optical lithography does not depend on types of these components as far as they have the desired functions. Therefore, it should be clearly understood the lithography according to this invention is not limited to types of resin compositions for optical lithography used in the present examples.

Figure 2:
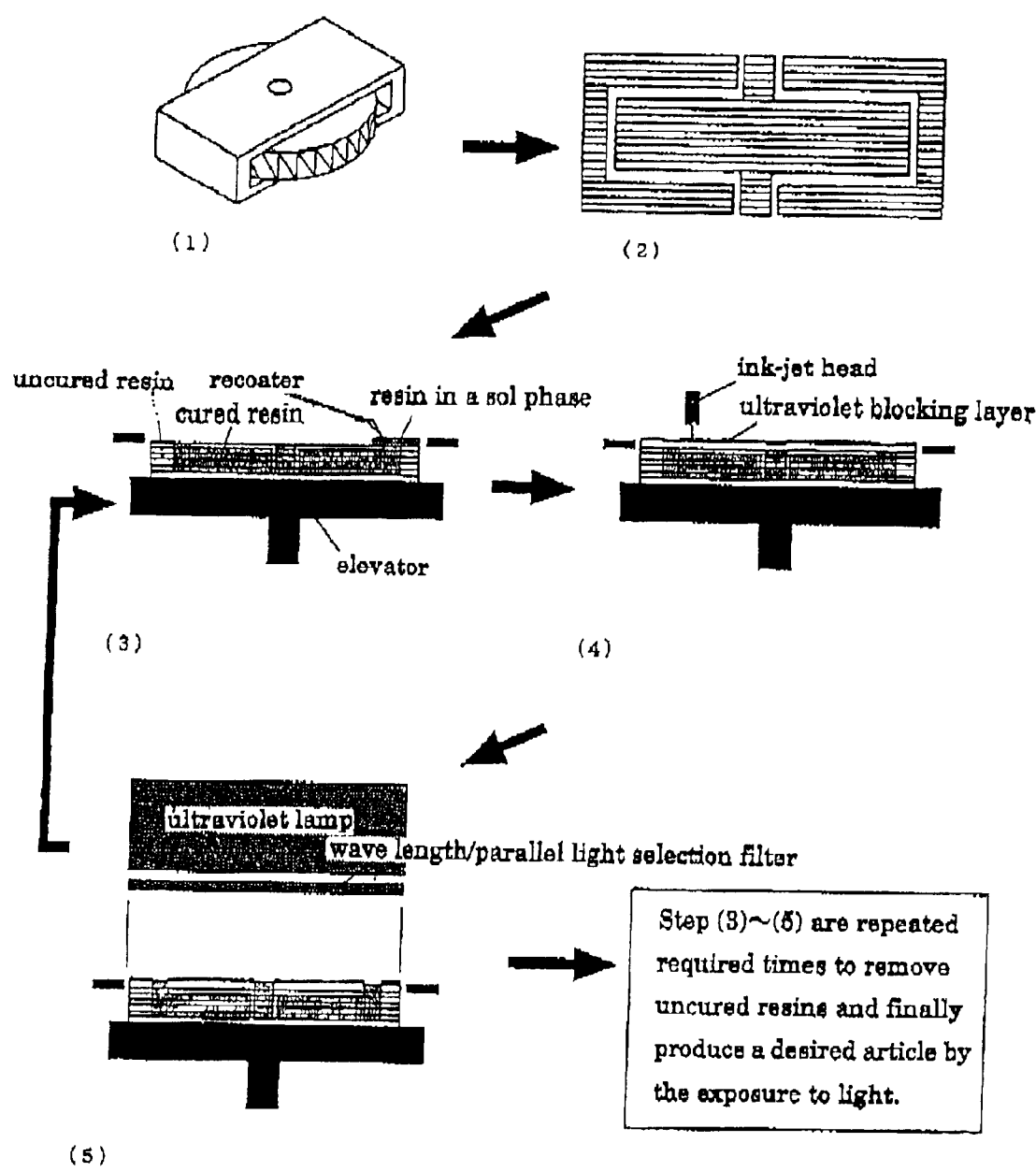
FIG. 2 is a schematic representation illustrating an optical lithography according to an embodiment.

In this example, to confirm the usefulness and effectiveness of this invention, a trial system has been designed and prepared (FIG. 2). In this trail system, as a resin composition for optical lithography, a composition [ultraviolet curable resin of the urethane acrylate series: syndiotactic poly(methylmethacrylate) : isotactic poly(methylmethacrylate) (both made by Kabushiki Kaisha Kurare)=75:16.7:8.3 (weight ratio)], which is in a gel state at room temperature and transforms to a sol state at about 80° C., was used. And, at the time when such a resin composition for optical lithography was supplied, a predetermined amount of the composition, which had been stored in a sol state under the conditions of 80° C. or higher, was arranged to be extruded onto an elevator, and supplied to the flat ice using a recoater.

Thus, the composition supplied onto the elevator was gelated in about 30 second under the conditions of an ordinary temperature. Then, a mask pattern comprising an ultraviolet blocking layer was drawn on the surface of the composition which bad been transformed to a gel phase using an ink-jet head, and exposed to an ultraviolet lamp. A one-layer amount of the resin composition for optical lithography was further extruded over the photocured layer leaving the existing mask pattern on the layer. Then, a desired three-dimensional shape was obtained by repeating these processes. After the completion of lithography, the block in a gel state thus obtained was heat-treated at 80° C. for about 3 hours in an ultrasonically vibrated solvent such as toluene to remove uncured resin, and finally subjected to a post-exposure to light to attain the ultimate article. In this case, an ink-jet ink of dye series is usually repelled on the resin so that an ink coat often may not be formed. However, a pigment type ink does not has such problems that an ink coat may be successfully formed on the resin. In the present embodiment, the ink made by Toyo Ink was used.

Aforementioned processes are more specifically described with reference to FIG. 2 as follows.

(1) A desired shape for lithography is designed by a three-dimensional CAD.
↓
(2) A desired shape for lithography designed by a three-dimensional CAD is processed to the slice data.
↓
(3) A pre-warmed resin in a sol state is supplied.
↓
(4) A ultraviolet blocking mask pattern is drawn with a ink-jet head.
↓
(5) A selective exposure with light over the mask pattern comprising an ultraviolet blocking layer is made.

Herein, the resin in the above (3) transits to a gel phase in a short period of time of about 0.5~1 min after its supply, so that the following step (4) should be easily performed as mentioned above. According to the above-described table, the elevator is lowered one layer after the above-described step (5) is performed, and the above steps (3)~(5) are repeated a predetermined times without removing the mask pattern to form a desired three-dimensional shape, which is finally exposed to light after the removal of uncured resin, yielding the desired article.

Procedures of optical lithography according to the present example are principally similar as those disclosed in Japanese Patent Laid-open Publication No. Hei9-70897,but different from the latter in that, as described above, the former uses a component of rapid phase transition and that mask pattern is drawn directly on the gelated (solidified) resin composition after the phase transition.

Furthermore, the optical lithography according to this invention has the advantage that the drawing of mask pattern directly on the surface to be exposed to light minimizes errors in cured shape due to the diffusion of ultraviolet ray, and that the ultraviolet blocking layers, each of which is drawn on each layer and left without being removed (mounting to "n"-layers of ultraviolet blocking layers (mask patterns)) block the transmission light from the further upper layer ((n+1) layer) to completely suppress the excessive growth of layers in the depth direction.

This procedure is more specifically described with reference to FIG. 3. In the case of forming a three-dimensional article having a cross sectional shape as shown in FIG. 3(A), a one-layer amount of the resin composition for optical lithography is extruded and irradiated without mask with light to be photocured and this process is repeated three times to form a portion comprising the first three lower layers (FIG. 3(B)). And, another one-layer amount of the resin composition is extruded onto the uppermost layer, which is tentatively called the "n" layer, to form the (n+1) layer, which is then solidified (gelated) (FIG. 3(C)). A mask pattern 21 is then drawn directly on the (n+1) layer (FIG. 3(D)), and, under these conditions, the layer is irradiated over the mask pattern 21, i.e., exposed to light (FIG. 3(E)). Thus, a portion of layer under the mask pattern 21 is not photocured owing to the blocking effect by the mask pattern 21, and only the exposed portion 22 is photocured (FIG. 3(E)).

Then, without removing the mask pattern 21, the resin composition for optical lithography for one layer is extruded over the mask to form the (n+2)$^{th}$ resin layer (FIG. 3(F)). Next, when under these conditions, said (n+2) layer is irradiated with light from above, the irradiating light cannot penetrate the mask pattern 21 even if the light penetrates the (n+2) layer, so that the portions under the mask pattern 21 should not be photocured(FIG. 3(G)). As a result, an excessive growth in the depth direction (excessive growth in the (n+1) layer in the case of this example), which is generally regarded as a problem in the conventional optical lithography, can be completely avoided. Therefore, under the conditions in which portions from under the mask pattern on the (n+1) layer are not photocured, and no excessive growth for said (n+1) layer occurs, the (n+2) layer can be completely photocured (FIG. 3(H)).

Figure 3:
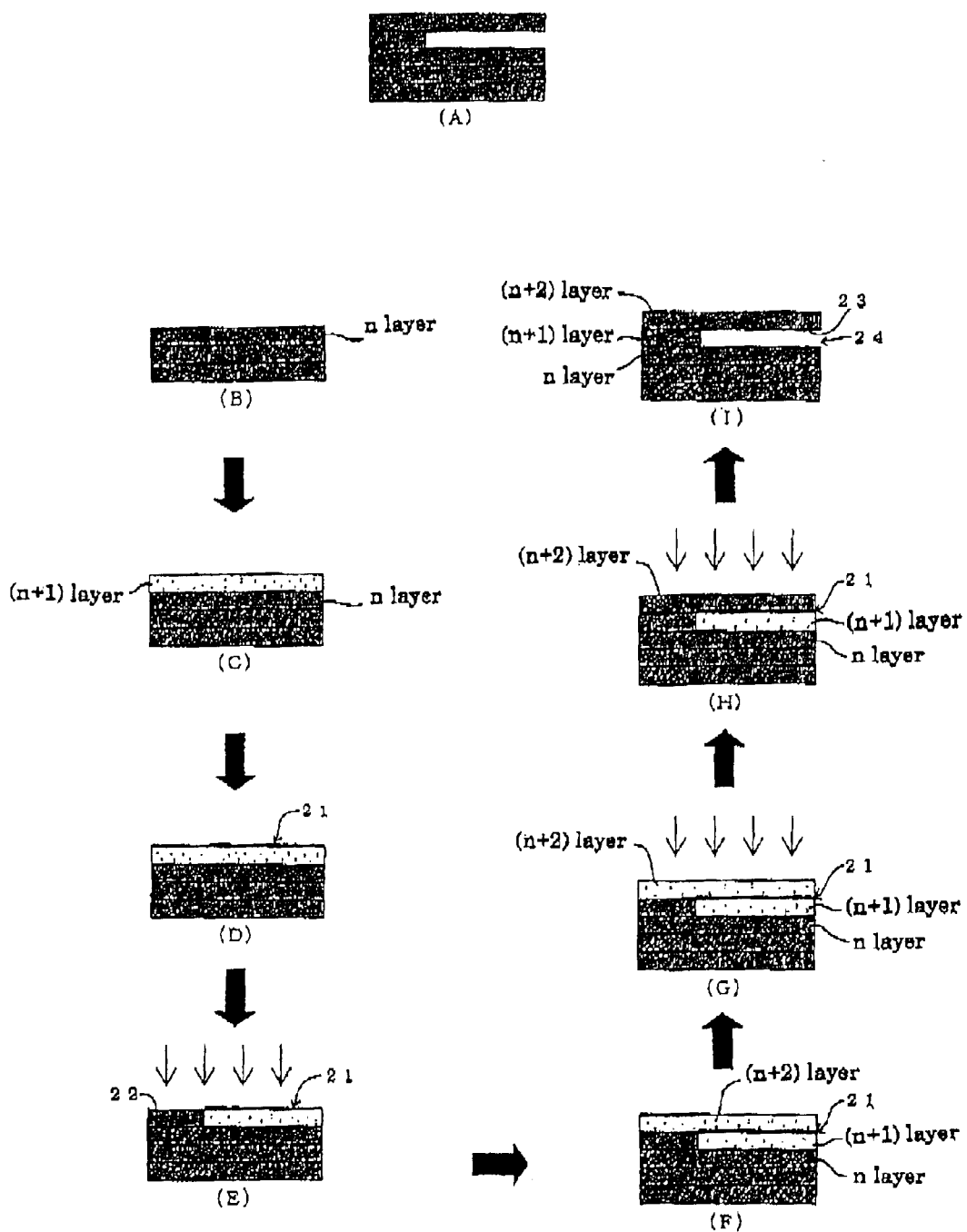
FIG. 3 is a schematic representation illustrating effects of this invention.

Referring to the processes described in FIG. 3, when an article in the state shown in FIG. 3(H) is immersed in a predetermined solvent and heated, the uncured portion of the (n+1) layer under the mask pattern 21 becomes in a sol state, and is eluted into the predetermined solvent to form the cavity 24, resulting in the formation of a three-dimensional article having a cross-sectional shape as shown in FIG. 3(A).

In this case, the mask pattern 21 drawn on the (n+1) layer was also removed together with the uncured portion of said (n+1) layer under said mask pattern 21. After the removal of them, the underneath 23 of the (n+2) layer becomes nearly flat. This is epoch-making in the optical lithography, where the control in the depth direction has been so difficult that fundamentally only the uneven underneath is produced.

In addition, the present inventors have been succeeded in forming a gear-shaped article as shown in FIG. 2(1), confirming that a lithography having a high resolution both in the X-Y axis and in the depth direction can be performed. Furthermore, using a similar trial system as described above, the present inventors also have performed an experiment to form a sample having a pair of engaging gears (such as the one having a pair of gears installed in the article shown in FIG. 2(1)), which cannot be assembled, and succeeded in rotating two gears freely after the post-treatment. Also, by drawing a mask on the upper surface of a layer corresponding to the underneath of overhanging portion in which the excessive growth occurs in the conventional lithography, the inventors have succeeded in forming two plates facing each other with a clearance of 100 μm in the height direction.

In addition, for example, in the article shown in FIG. 2(1), it is impossible to separate the gear portion from its same, so that this article cannot be assembled starting from separate parts. However, the fact that even such an article can be formed as one unit has been the advantage of conventional optical lithography, and this advantage is retained in the optical lithography according to this invention.

Thus, according to the present invention, it has been confirmed that, retaining the advantage of the conventional optical lithography, a lithography having not only a broad applicability but also a high resolution even in the height direction can be realized.

In summary, it may be said that the following effects can be obtained by the optical lithography according to this example.

1. By exposure to the parallel light via an ultraviolet ray blocking layer directly drawn on the surface of resin layer, a homogeneous photocuring with a uniform cross section can be carried out unlike the case with the beam-scanning. In addition, the exposure time per layer becomes constant.
2. With an ultraviolet ray blocking layer, it becomes possible to precisely control the curing depth per layer and perform a laminating lithography with high precision per layer as a result of the avoidance of excessive curing.
8. By improving the reflectance of the ultraviolet ray blocking lays, it becomes possible to near the non-uniform exposure to light in one layer to a uniform stats.

Industrial Applicability

As described above, according to this invention, since it is possible to not only perform a supportless lithography but also obtain a homogenous cured layer with a uniform cross section as well as completely suppress the excessive growth by the transmitting light, a lithography having a broad range of applicability and a high resolution and precision both in the X-Y surface as well as in the depth (height) direction can be realized.

Furthermore, since, by realizing lithographic techniques according to this invention, it becomes possible to perform a integral lithography to form a complicatedly combined structure with little clearance, a further broad application of this invention to a field of preparation beyond a mere concept model or simple functional model can be expected.

What is claimed is:

1. An optical lithography for producing a three-dimensional article comprising repeating light irradiation on the surface of a resin composition for optical lithography containing a photocurable component in a drawing manner to form a cured resin layer corresponding to said pattern to form the three-dimensional article composed of multiple cured resin layers, wherein said resin composition for optical lithography is configured to undergo a reversible and rapid sol-gel transition upon the application of a physical stimulus, and wherein said lithography comprises the processes of: rapidly gelating said resin composition for optical lithography by applying said physical stimulus, drawing a predetermined mask pattern directly on the surface of said gelated resin composition for optical lithography, and irradiating light over the mask pattern from above.

2. An optical lithography as defined in claim 1, wherein said physical stimulus is a temperature change.

3. An optical lithography comprising processes of: forming the "n"th resin layer by supplying a one-layer amount of resin composition for optical lithography containing a photocurable component which causes a reversible and rapid sol-gel transition with a physical stimulus, gelating said "n"th resin layer with the physical stimulus, drawing a predetermined mask pattern directly on the surface of said gelated "n"th resin layer, forming the "n"th cured resin layer by irradiating, after drawing the mask pattern, the "n"th resin layer with light over said mask pattern to photocure said "n"th resin layer according to said mask pattern, and forming the "(n+1)"th resin layer by supplying a one-layer of said resin composition for optical lithography over the "n"th cured resin layer formed in the previous process.

4. An optical lithography as defined in claim 3, wherein said physical stimulus is a temperature change.

5. An optical lithography as defined in any one of claims 1, 3, 2 and 4, wherein said resin composition for optical lithography comprises photocurable resins of urethane acrylate series, ester acrylate series, epoxy acrylate series or epoxy series as the photocurable component.

6. An optical lithography as defined in any one of claims 1, 3, 2 and 4, wherein said resin composition for optical lithography contains syndiotactic poly(methacrylic acid ester) and isotactic poly(methacrylic acid ester) as the photocurable component.

7. An optical lithography as defined in claim 6, wherein said resin composition for optical lithography contains syndiotactic poly(methylmethacrylate) and isotactic poly(methylmethacrylate) as the photocurable component.

* * * * *